United States Patent
Miller et al.

(10) Patent No.: US 6,416,696 B1
(45) Date of Patent: *Jul. 9, 2002

(54) AQUEOUS MIXED PMDI/PHENOLIC RESIN BINDERS FOR THE PRODUCTION OF WOOD COMPOSITE PRODUCTS

(75) Inventors: Todd R. Miller, Eugene, OR (US); James W. Rosthauser, Pittsburgh, PA (US)

(73) Assignees: Bayer Corporation, Pittsburgh, PA (US); Borden Chemical Inc, Springfield, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/465,279

(22) Filed: Dec. 16, 1999

(51) Int. Cl.$^7$ .................................................. B27N 3/00
(52) U.S. Cl. ........................................ 264/109; 264/122
(58) Field of Search ............................... 264/109, 122, 264/125, 126

(56) References Cited

U.S. PATENT DOCUMENTS

| | | | |
|---|---|---|---|
| 3,438,940 A | 4/1969 | Keberle et al. ............... 260/67 |
| 3,666,593 A | 5/1972 | Lee ............................. 156/285 |
| 3,870,665 A | 3/1975 | Diehr et al. ................ 260/17.2 |
| 3,905,934 A | 9/1975 | Gardikes ................. 260/31.8 T |
| 4,098,933 A | 7/1978 | Burkhardt et al. ........... 427/379 |
| 4,100,328 A | 7/1978 | Gallagher ................... 428/407 |
| 4,209,433 A | 6/1980 | Hse ........................... 260/29.3 |
| 4,284,544 A | 8/1981 | Wegner et al. ....... 260/29.2 TN |
| 4,293,480 A | 10/1981 | Martin et al. ................. 260/38 |
| 4,522,851 A | 6/1985 | Rosthauser .................. 427/386 |
| 4,546,039 A | 10/1985 | Horacek et al. ............. 428/357 |
| 4,602,069 A | 7/1986 | Dunnavant et al. ......... 525/504 |
| 4,609,513 A | 9/1986 | Israel ......................... 264/122 |
| 4,617,223 A | 10/1986 | Hiscock et al. ............. 428/211 |
| 4,683,252 A | 7/1987 | Dunnavant et al. ......... 523/143 |
| 4,944,823 A | 7/1990 | Stofke ........................ 156/283 |
| 4,961,795 A | 10/1990 | Detlefsen et al. ........... 156/62.2 |
| 5,001,190 A | 3/1991 | Carpenter et al. ........... 524/871 |
| 5,008,359 A | 4/1991 | Hunter ........................ 527/103 |
| 5,101,001 A | 3/1992 | Henry et al. ................ 528/139 |
| 5,130,419 A * | 7/1992 | Brown et al. |
| 5,140,086 A | 8/1992 | Hunter et al. ............... 527/103 |
| 5,143,768 A | 9/1992 | Wilderman et al. .......... 428/68 |
| 5,179,143 A | 1/1993 | Konig et al. .................. 524/35 |
| 5,204,176 A | 4/1993 | Seiss et al .................. 428/304 |
| 5,217,665 A | 6/1993 | Lim et al. ..................... 264/83 |
| 5,296,160 A | 3/1994 | Tirpak et al. ............. 252/182.2 |
| 5,332,458 A | 7/1994 | Wallick ...................... 156/210 |
| 5,674,568 A | 10/1997 | Layton et al. ............ 427/389.9 |
| 5,733,952 A | 3/1998 | Geoffrey ..................... 523/143 |
| 5,750,201 A * | 5/1998 | Phanopoulos et al. |
| 6,096,805 A | 8/2000 | Lange et al. ................ 523/336 |
| 6,214,265 B1 * | 4/2001 | Rosthauser et al. ......... 264/109 |

FOREIGN PATENT DOCUMENTS

| | | |
|---|---|---|
| GB | 1387454 | 3/1972 |
| WO | 88/03090 | 5/1988 |
| WO | 89/07626 | 8/1989 |
| WO | 00/35985 | 6/2000 |

OTHER PUBLICATIONS

James B. Wilson's paper entitled, "Isocyanate Adhesives as Binders for Composition Board" which was presented at the symposium "Wood Adhesives—Research, Applications and Needs" head in Madison, Wisconsin on Sep. 23–25, 1980.

* cited by examiner

*Primary Examiner*—Mathieu D. Vargot
(74) *Attorney, Agent, or Firm*—Joseph C. Gil; N. Denise Brown

(57) ABSTRACT

The present invention relates to a process for the production of wood composite products consisting of combining wood particles with a binder composition, and molding or compressing the combination of wood particles and binder composition. Suitable binder compositions comprise (1) an aqueous dispersion of a blocked polyisocyanate component and (2) an aqueous solution of a phenolic resin.

16 Claims, No Drawings

1

AQUEOUS MIXED PMDI/PHENOLIC RESIN BINDERS FOR THE PRODUCTION OF WOOD COMPOSITE PRODUCTS

BACKGROUND OF THE INVENTION

This invention relates to a process for the production of wood composite materials. This process consists of combining wood particles with a composition, and molding or compressing the combination formed. Suitable compositions comprise a blocked polyisocyanate and an aqueous solution of phenolic resin.

Composite materials such as oriented stand board, particle board and flake board are generally produced by blending or spraying lignocellulose materials such as wood flakes, wood fibers, wood particles, wood wafers, strips or strands, pieces of wood or other comminuted lignocellulose materials with a binder composition while the materials are tumbled or agitated in a blender or like apparatus. After blending sufficiently to form a uniform mixture, the materials are formed into a loose mat, which is compressed between heated platens or plates to set the binder and bond the flakes, strands, strips, pieces, etc., together in densified form. Conventional processes are generally carried out at temperatures of from about 120 to 225° C. in the presence of varying amounts of steam generated by liberation of entrained moisture from the wood or lignocellulose materials. These processes also generally require that the moisture content of the lignocellulose material be between about 2 and about 20% by weight, before it is blended with the binder.

Plywood production is accomplished by roll coating, knife coating, curtain coating, or spraying a binder composition onto veneer surfaces. A plurality of veneers are then laid-up to form sheets of required thickness. The mats or sheets are then placed in a heated press and compressed to effect consolidation and curing of the materials into a board.

Binder compositions which have been used in making such composite wood products include phenol formaldehyde resins, urea formaldehyde resins and isocyanates. See, for example, James B. Wilson's paper entitled, "Isocyanate Adhesives as Binders for Composition Board" which was presented at the symposium "Wood Adhesives—Research, Applications and Needs" held in Madison, Wis. on Sep. 23–25, 1980, in which the advantages and disadvantages of each of these different types of binders are discussed.

Phenolformaldehyde and urea-formaldehyde binders are relatively inexpensive and provide lignocellulosic composites with properties suitable for many application areas. They can be formulated so that emissions of formaldehyde are negligible. Phenol-formaldehyde resins and urea-formaldehyde resins are typically supplied in aqueous media giving them ease of application. They typically have to be used with lignocellulosic materials having lower moisture contents. Otherwise, they demand high temperature and long pressing times to provide cured lignocellulosic composites. They provide boards with high structural strength but may have high water absorption limiting the areas where they can be used.

Isocyanate binders are commercially desirable because they have flexibility in formulation, versatility with respect to cure temperature and rate, the ability to bond with lignocellulosic materials having high water contents, low water absorption, high adhesive and cohesive strength, excellent structural properties, and no formaldehyde emissions. The disadvantages of isocyanates are difficulty in processing due to their high reactivity, adhesion to platens, lack of cold tack, high cost and the need for special storage.

U.S. Pat. No. 3,870,665 and German Offenlegungsschrift No. 2,109,686 disclose the use of polyisocyanates (and catalysts therefor) in the manufacture of plywood, fiberboard, compression molded articles, as well as various technical advantages when used as binders.

It is known to treat cellulosic materials with polymethylene poly(phenyl isocyanates) ("polymeric MDI") to improve the strength of the product. Typically, such treatment involves applying the isocyanate to the material and allowing the isocyanate to cure, either by application of heat and pressure (see, e.g., U.S. Pat. Nos. 3,666,593, 5,008,359, 5,140,086, 5,143,768, and 5,204,176) or at room temperature (see, e.g., U.S. Pat. Nos. 4,617,223 and 5,332,458). While it is possible to allow the polymeric MDI to cure under ambient conditions, residual isocyanate groups remain on the treated products for weeks or even months in some instances. It is also known to utilize toluylene diisocyanate for such purposes.

Isocyanate prepolymers are among the preferred isocyanate materials which have been used in binder compositions to solve various processing problems, particularly adhesion to press platens and high reactivity. U.S. Pat. No. 4,100,328, for example, discloses isocyanate-terminated prepolymers which improve product release from a mold. U.S. Pat. No. 4,609,513 also discloses a process in which an isocyanate-terminated prepolymer binder is used to improve product release. A binder composition in which a particular type of isocyanate prepolymer is used to improve adhesiveness at room temperature is disclosed in U.S. Pat. No. 5,179,143.

A major processing difficulty encountered with isocyanate binders is the rapid reaction of the isocyanate with water present in the lignocellulosic material and any water present in the binder composition itself. One method for minimizing this difficulty is to use only lignocellulosic materials having a low moisture content (i.e., a moisture content of from about 3 to about 8%). This low moisture content is generally achieved by drying the cellulosic raw material to reduce the moisture content. Such drying is, however, expensive and has a significant effect upon the economics of the process. Use of materials having low moisture contents is also disadvantageous because panels made from the dried composite material tend to absorb moisture and swell when used in humid environments.

Another approach to resolving the moisture and isocyanate reactivity problem is disclosed in U.S. Pat. No. 4,546,039. In this disclosed process, lignocellulose-containing raw materials having a moisture content of up to 20% are coated with a prepolymer based on a diphenylmethane diisocyanate mixture. This prepolymer has a free isocyanate group content of about 15 to about 33.6% by weight and a viscosity of from 120 to 1000 mPa·s at 25° C. This prepolymer is prepared by reacting (1) about 0.05 to about 0.5 hydroxyl equivalents of a polyol having a functionality of from 2 to 8 and a molecular weight of from about 62 to about 2000 with (2) one equivalent of a polyisocyanate mixture containing (a) from 0 to about 50% by weight of polyphenyl polymethylene polyisocyanate and (b) about 50 to about 100% by weight isomer mixture of diphenylmethane diisocyanate containing 10 to 75% by weight of 2,4'-isomer and 25 to 90% by weight of 4,4'-isomer.

The large scale industrial manufacture of composite materials which are bonded exclusively with polyisocyanates has previously been limited. The use of some of the polyisocyanates, particularly the better performing isocyanates, such as polymethylene diisocyanate has been limited by their cost. Because of the cost constraints, the level of use of these expensive isocyanates is kept low for a given composite material. One approach to the use of levels of these isocyanates has involved chain extending the isocyanate with inexpensive extenders. In most cases, the extenders must be substantially water-free.

U.S. Pat. No. 4,944,823 describes a composition for bonding solid lignocellulosic materials. Suitable binder formulations are based on the reactive mixture of an isocyanate and a carbohydrate material. These are both effective and inexpensive, and eliminate health hazards associated with the use of formaldehyde. Carbohydrate materials include, for example, sugars and starches, in the presence or absence of other active materials. These carbohydrates are mixed with a liquid diisocyanate and applied to the wood, which is then pressed to form a composite product.

Binder compositions comprising phenolic resins and polyisocyanates are known and described in, for example, U.S. Pat. Nos. 3,905,934, 4,293,480, 4,602,069, 4,683,252, 5,001,190, 5,101,001 and 5,733,952, and WO 88/03090 and WO 89/07626. These binder compositions are disclosed as being suitable for foundry cores and molds. The materials are typically applied in an organic solvent and cured most often in the presence of gaseous amine vapors.

U.S. Pat. No. 5,001,190 and PCT application WO 88/03090 disclose a process for filling a space within a structure with a polyurethane composite in the presence of water. Suitable polyurethane composites comprise (a) adding a coarse aggregate to the space in the structure to be filled, (b) adding a polyurethane binder to the aggregate, wherein the binder comprises (i) a phenolic resin component comprising a resole phenolic resin and a hydrophobic solvent system, and (ii) a polyisocyanate component comprising an aromatic polyisocyanate and a hydrophobic solvent, and (iii) a urethane promoting catalyst.

Foundry binders based on phenolic resole resins and polyisocyanates are described in U.S. Pat. Nos. 5,101,001 and 5,733,952, and PCT application WO 89/07626. The compositions of U.S. Pat. No. 5,733,952 also comprise an epoxy resin and, preferably, paraffinic oil. Polymerized linseed oil is utilized in the binders of WO 89/07626.

Isocyanates are known to be suitable components for treating cellulosic fiber and wood products. Some processes for this treatment are described in, for example, U.S. Pat. Nos. 5,179,143 and 5,674,568. The binders of U.S. Pat. No. 5,179,143 comprise polyisocyanates, compounds containing at least two isocyanate reactive hydrogen atoms and alkylene carbonates. The binders for modified cellulosic products of U.S. Pat. No. 5,674,568 comprise a polymethylene poly(phenylisocyanate), water, and an organic compound having a hydroxy functionality of from 2 to 8 and a molecular weight of about 60 to 8000 and being selected from the group consisting of ester group-free polyhydric alcohols, polyether polyols and mixtures thereof.

Binders comprising polyisocyanates and phenolic resins are known and described as being suitable for preparing wood composite products by U.S. Pat. Nos. 4,209,433, and 5,217,665. Suitable phenolic resins disclosed by these references are resole resins. U.S. Pat. No. 4,209,433 requires that the polyisocyanate be added to the wood particles prior to the application of the phenolic resin, thereby producing enhanced adhesive characteristics. The binder compositions of U.S. Pat. No. 4,961,795 may be cured with a curing agent comprising an ester, a lactone or an organic carbonate, which may be moderated by an aliphatic mono- or polyhydric alcohol.

A method of producing waferboard is described by U.S. Pat. No. 5,217,665. This method comprises applying first a liquid phenol formaldehyde resin to the surface of the wafers, then a powdered phenol formaldehyde resin. This is followed by forming layup and pressing at elevated temperature and pressure using steam pressing techniques to consolidate the layup into a board and to set the phenolic resin adhesive.

A disadvantage common to these patents is that the polyisocyanate and resole resin must be added separately. Mixtures of the aqueous phenolic with unmodified organic polyisocyanates are often incompatible and unstable. The mixtures separate quickly and the isocyanate forms insoluble ureas upon reaction with the aqueous solvent. This reaction is accelerated by the base present in most resoles.

One solution to the problems of limited potlife stability is to block the isocyanate groups. A method to improve compatibility is to incorporate groups that make the polyisocyanate water dispersible. Thus, use of water dispersible blocked polyisocyanates may avoid disadvantages of prior art combinations of polyisocyanate and aqueous phenolic resins.

Water dispersible polyisocyanate is typically blocked prior to dispersing it in water as described in U.S. Pat. Nos. 4,522,851, 4,098,933, and 4,284,544. The disadvantage of blocking the polyisocyanate before it is dispersed in water is that the blocked polyisocyanate is generally a solid or a high viscosity liquid which is very difficult or impossible to disperse in water without first diluting the blocked polyisocyanate in an organic solvent or heating the blocked polyisocyanate to an elevated temperature to reduce its viscosity.

Because one of the primary reasons for dispersing polyurethanes and polyisocyanates is to avoid the unnecessary use of organic solvents, it is certainly not desirable to have to dilute the blocked polyisocyanate with an organic solvent in order to reduce its viscosity sufficiently to disperse it in water. In addition, the extra energy costs and time which are necessary to heat the blocked polyisocyanate to an elevated temperature to reduce its viscosity are also undesirable.

Methods to produce blocked isocyanates directly in aqueous media have been described in, for example, U.S. Pat. Nos. 3,438,940 and 5,296,160. U.S. Pat. No. 3,438,940 describes polyisocyanate adducts of sodium bisulfite that are soluble in water, but the aqueous solutions of these polyisocyanates are generally acidic and thus not compatible with the alkaline aqueous phenolic resins. U.S. Pat. No. 5,296,160 describes aqueous dispersions of blocked isocyanates, in which the blocking group volatilizes from the polymer during curing. Although materials of this type are compatible with the alkaline aqueous phenolic resins, the release of the volatile organic compounds used as blocking groups is undesirable.

It is the purpose of this invention to provide a storage stable, one component binder system for lignocellulose composites based on aqueous resole resins and water-emulsified, blocked polyisocyanate. By carefully selecting unique blocking agents that contain both oxime and phenol functionality, it is possible to form the blocked polyisocyanate in aqueous solution avoiding highly viscous intermediates. Also, the blocking agent is not volatilized as the composite is pressed, but rather it is incorporated into the binder by reaction with the phenolic resin.

SUMMARY OF THE INVENTION

The present invention relates to a process for the production of wood composite materials comprising a) combining wood particles with 2 to 15% by weight, based on the total weight of the wood composite, of a composition, and b) molding or compressing the combination formed in a). The compression or molding typically occurs at pressures of from about 200 to 1000 psi (preferably 300 to 700 psi) for about 2 to 10 (preferably 4 to 8) minutes at temperatures of from about 120° C. to 220° C. (preferably 150 to 200° C.).

Suitable compositions for this invention consist essentially of (1) an aqueous dispersion of a blocked polyisocyanate component consisting essentially of an adduct of:
  (i) a polymethylene poly(phenylisocyanate) having a functionality of about 2.1 to about 3.5, an NCO group content of from about 30% to about 33%, and a monomer content of from about 30% to about 90% by weight, wherein the content of the monomer comprises from up to about 5% by weight of the 2,2'-isomer, from about 1% to about 20% by weight of the 2,4'-isomer, and from about 25% to about 65% by weight of the 4,4'-isomer, based on the entire weight of the polyisocyanate; and
  (ii) a compound corresponding to the general formula:

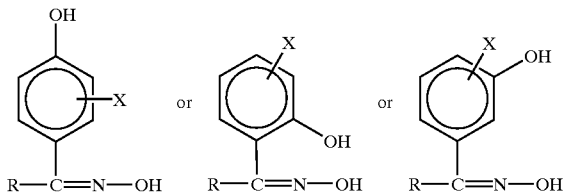

wherein:
R: represents a hydrogen atom, an alkyl group having from 1 to 12 carbon atom, a phenyl group, or a substituted phenyl group, and preferably represents a substituted hydroxyphenyl group; and
X: represents a hydrogen atom, an alkyl group having from 1 to 12 carbon atoms, an alkoxy group having from 1 to 12 carbon atoms, a phenyl group, a substituted phenyl group, or a methylol radical, and preferably an alkyl methylol radical; and (2) an aqueous solution of a resole phenolic resin,
wherein the weight ratio of component (1) to component (2) is from 4:1 to 1:20, preferably from 1:1 to 1:10, most preferably from 1:2 to 1:5, and wherein the weight ratio of component (1)(i) to (1)(ii) is from 10:1 to 1:10, preferably from 5:1 to 1:5 and most preferably from 2:1 to 1:1.

In accordance with the present invention, wood particles are combined with from about 2 to 15% by weight, preferably from 4 to 10% by weight, most preferably with from 5 to 8% by weight of the binder compositions, based on the total weight of the wood composite.

The solids content of the sum of (1) the dispersion of the blocked polyisocyanate and (2) the aqueous solution of the resole is from 10 to 70%, (i.e., water is 30 to 90%), preferably from 20 to 60% (i.e., water is 40 to 80%), and most preferably from 30 to 55% (i.e., water is 45–70%), based on the combined weight of (1) and (2).

When the binders are combined in this ratio, they are aqueous solutions or aqueous dispersions with potlifes extended compared to those prepared from the aqueous resole and unmodified polymeric MDI.

DETAILED DESCRIPTION OF THE INVENTION

The aqueous dispersion of the blocked polyisocyanate component, i.e., component (1), of the present invention consists essentially of an adduct of (i) a polymethylene poly(phenylisocyanate) component and (ii) a compound corresponding to one of the specified structures below. It is preferably formed in the presence of component (2), the aqueous solution of the phenolic resin.

"Polymeric MDI" as used herein, refers to the three-ring and/or higher ring products derived by the phosgenation of aniline-formaldehyde condensation products.

Suitable polyisocyanates to be used as component (1)(i) of the compositions in the present invention include those polymethylene poly(phenylisocyanate) blends having an NCO group content of about 25% to 33% by weight, and having a viscosity of less than about 2,000 cps at 25° C.

The polyisocyanates of the present invention have a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the blend. The polymeric MDI content of these isocyanates varies from about 10 to about 70% by weight, preferably from about 30% to about 60% by weight.

It is preferred that the polyisocyanates used as component (1)(i) in the present invention have an average functionality of about 2.3 to about 3.0, most preferably of about 2.4 to about 2.8, and a monomer content of preferably 40 to 80%, most preferably of 40 to 70% by weight. The content of monomeric MDI preferably comprises less than 1% by weight of the 2,2'-isomer of MDI, less than 5% by weight of the 2,4'-isomer of MDI and from about 30 to about 60% by weight of the 4,4'-isomer of MDI, based on the entire weight of the polyisocyanate. Preferred polyisocyanates have viscosities of 10 to 1000 cps, more preferred polyisocyanates have viscosities of 40 to 400, and most preferred polyisocyanates have viscosities of 100 to 300 cps.

A preferred polymethylene poly(phenylisocyanate) blend has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the blend. This polyiso-cyanate blend comprises from about 20 to about 45% by weight of polymeric MDI.

Most preferred polyisocyanates include, for example, polymethylene poly(phenylisocyanate) blends having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the blend. This isocyanate blend comprises from about 50 to about 60% by weight of polymeric MDI.

Suitable polyisocyanates for component (1)(i) of the present invention also include, for example, mixtures of polyisocyanate blends as described above with adducts of MDI including, for example, allophanates of MDI as described in, for example, U.S. Pat. Nos. 5,319,053, 5,319, 054 and 5,440,003, the disclosures of which are herein incorporated by reference, and carbodiimides of MDI as described in, for example, U.S. Pat. Nos. 2,853,473, 2,941, 966, 3,152,162, 4,088,665, 4,294,719 and 4,244,855, the disclosures of which are herein incorporated by reference. Modified polyisocyanates are less preferred.

Suitable compounds to be used as blocking agents, i.e. component (1)(ii), for the polymethylene poly(phenyl isocyanates) of the present invention include, for example, those compounds corresponding to the general formulas below:

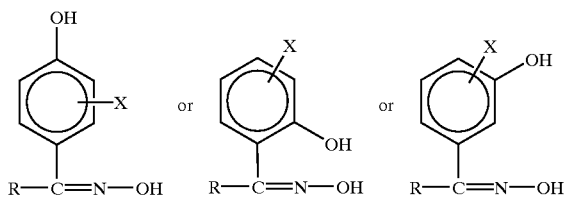

wherein:
R: represents a hydrogen atom, an alkyl group having from 1 to 12 carbon atoms, a phenyl group, or a substituted phenyl group; and preferably a substituted hydroxyphenyl group; and X: represents a hydrogen atom, an alkyl group having from 1 to 12 carbon atoms, an alkoxy group having from 1 to 12 carbon atoms, a phenyl group, a substituted phenyl group, or a methylol radical, preferably an alkyl methylol radical, and most preferably an alkyl methylol radical having from 1 to 12 carbon atoms.

Some illustrative examples of suitable compounds for blocking the polyisocyanate include but are not limited to compounds such as 2-hydroxybenzaldoxime, 3-hydroxybenzaldoxime, 4-hydroxybenzaldoxime, 2,6-dihydroxybenzaldoxime, heptylsalicylaldoxime, octylsalicylaldoxime, nonylsalicylaldoxime, dodecylsalicylaldoxime, 2-hydroxy-3-methyl benzaldoxime, 4-hydroxy-3-methoxybenzaldoxime, 2'-hydroxy-5'-nonylacetophenone oxide, 2'-hydroxy-5'-nonyl benzophenone oxime, 2,2'-dihydroxybenzophenone oxime, 4,4'-dihydroxybenzophenone oxime, etc. Preferred compounds are 2-hydroxybenzaldoxime, 3-hydroxybenzaldoxime, 4-hydroxybenzaldoxime, heptylsalicylaldoxime, octylsalicylaldoxime, nonylsalicylaldoxime, dodecylsalicylaldoxime, and 4,4'-dihydroxybenzophenone oxime.

The weight ratio of the isocyanate in the polymethylene poly(phenylisocyanate) (1)(i) to the blocking agent (1)(ii) can be from about 10:1 to about 1:10, preferably from about 5:1 to about 1:5, and most preferably from about 2:1 to about 1:1. The blocked polyisocyanates can be and preferably are prepared directly in an aqueous solution. A base neutralized solution of the blocking agent can be added to the polyisocyanate. Preferably the isocyanate is added to the base neutralized solution of the blocking agent. Most preferably, the isocyanate is added to a mixture of the base neutralized aqueous solution and the resole resin. A neutralizing agent must be present for the phenolic group in an amount such that from 10 to 100%, preferably from 50 to 100%, most preferably from 70 to 100% of the molar amount of the phenolic groups are neutralized. Some examples of suitable bases to be used as neutralizing agents in the present invention include compounds such as sodium hydroxide, potassium hydroxide, ammonia, amines, especially tertiary amines, and trimethyl ethanolamine. Sodium hydroxide is a particularly preferred neutralizing agent.

Phenolic resins are obtained by the condensation of a phenolic compound with an aldehyde. Resole and resitole resins are prepared generally using an alkaline catalyst with excess formaldehyde and result in polymers having pendant methylol groups. In the resitole stage, the resins are characterized by high viscosity. Since each methylol group constitutes a potential cross-linking site, the resole and resitole resins are readily converted to the cross-linked, infusible polymers by heating. However, these resins can be highly unstable.

Suitable phenolic resins for the present invention are present as aqueous solutions with pH of 8–13 and are classified as resole resins. The solids levels of these resoles are typically in the range of 10 to 70%, based on the weight of the resin plus water in the solutions. They are prepared using an excess of aldehyde in alkaline catalyzed reaction with phenols. Suitable examples of such resole resins are known and described in, for example, U.S. Pat. Nos. 3,839, 251 and 4,961,795, the disclosures of which are herein incorporated by reference. Additional information relative to the preparation of the phenolic resins can be found in, for example, the Encyclopedia of Chemical Technology by Kirk Othmer, Fourth Edition, Volume 18, pp. 609–612.

Suitable phenolic resins for the present invention compositions are
(a) a mixture of dimethylol compounds having the formulas:

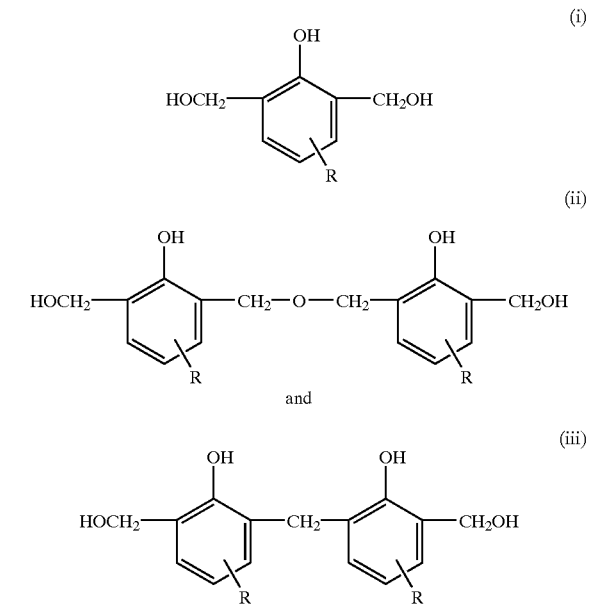

wherein:
R: represents a hydrogen atom or a phenolic substituent meta to the phenolic hydroxyl group; and
(b) higher molecular weight condensation products of the mixture having the general formula:

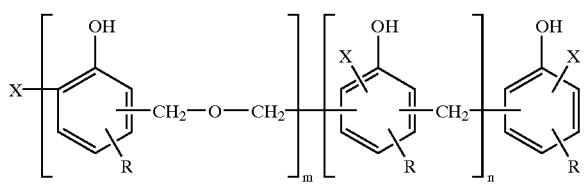

wherein:
R: represents a hydrogen atom or another hydroxyl group substituent meta to the phenolic group;
X: represents an end group from the group consisting of hydrogen, methylol, and alkyl methylol, wherein the molar ratio of methylol and alkyl methylol to hydrogen end groups is greater than 1:1; and
m and n: are each independently selected from a number between 0 and 20.

These resole resins are typically prepared by the reaction of a suitable phenol group containing compound wherein an excess of the aldehyde group containing compound is present. Suitable phenolic components include nonyl phenol, as well as virtually any of the phenols which are not substituted at either the two ortho-positions or at one ortho and the para-positions. It is necessary that these positions be unsubstituted for the polymerization reaction with the aldehyde to occur. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions, substituted phenols employed in the formation of the resole resins include, for example, alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include, for example, phenol, 2,6-xylenol, o-cresol, m-cresol, p-cresol, 3,5-xylenol, 3,4-xylenol, 2,3,4-trimethyl phenol, 3-ethyl phenol, 2,5-diethyl phenol, p-butyl phenol, 3,5-dibutyl phenol, p-amyl phenol, p-cyclohexyl phenol, p-octyl phenol 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the formula:

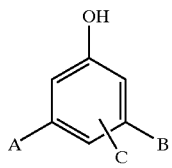

wherein:
A, B, and C: each independently represents a hydrogen atom, a hydroxyl radical, a hydrocarbon radical, an oxyhydrocarbon radical or a halogen radical.

Also, suitable phenolic compounds are those compounds containing a second phenolic group such as, for example, catechol, resorcinol and hydroquinone.

The aldehydes reacted with the phenol can include any of the aldehydes theretofore employed in the formation of phenolic resins such as, for example, formaldehyde, acetaldehyde, propionaldehyde, furfuraldehyde, and benzaldehyde. In general, the aldehydes employed have the formula: R'CHO wherein R' is a hydrogen or a hydrocarbon radical of 1 to 8 carbon atoms. Formaldehyde is the most preferred aldehyde.

Known catalysts for accelerating the isocyanate addition reaction with hydroxyls may in principle be used in forming these binder compositions. The use of catalysts is not, however, necessary to the present invention. Suitable catalysts for this purpose include, for example, tin compounds such as dibutyl tin dilaurate or tin(ll) octoate; and tertiary amines such as, for example, triethylene diamine, dimethylethyl amine, pyridine, 4-phenylpropyl pyridine, bis(N,N-dimethylaminoethyl)ether, N,N'-dimethylaminoethyl-N-methyl ethanolamine, N,N-dimethylaminoethyl morpholine, quinoline, morpholine, N-methyl morpholine, etc. Other catalysts are described in "Kunstoff Handbuch", Volume VII, published by Becker and Braun, Carl Hanser Verlag, Munich, 1983 on pages 92–98. The catalysts are used, if at all, in a quantity of about 0.001 to 10% by weight, preferably about 0.002 to 0.1% by weight, based on the total quantity of reactants.

Other optional additives and/or auxiliary agents which may be included in the binding compositions of the present invention include, for example, wax emulsions for reduced water absorption, preservatives, surface active additives, e.g., emulsifiers and stabilizers, mold release agents such as, for example, zinc stearate, etc. As stabilizing agents which reduce swelling and water absorption, there may be mentioned sodium chloride, sodium sulfate, paraffin, fatty acids or their salts such as zinc stearate and other similar materials. At the same time, paraffin and fatty acids and their salts may serve as release agents. Use of other active materials may shorten pressing and curing time.

As indicated above, the percentages of ingredients in the wood binder compositions according to the present invention can vary widely according to needs and conditions of a particular application. In general, however, quantities in the defined ranges have been found suitable, bearing in mind that the other active materials may comprise one or more of the catalysts, stabilizing agents and release agents.

This binder formulation may be used in an amount of 2 to 15% by weight, based on the resin solids expressed as a percentage of the total wood weight. Preferably, the quantity of solid binder formulation based on the weight of the wood is about 4 to 10%, most preferably 5–8%, depending on the configuration of the particulate wood and the requirements of the products.

Binder formulations according to the present invention are made by blending together the various components in the proper sequence as noted above. When producing the preferred aqueous binders, such blending preferably involves vigorous agitation for several minutes, such as in a suitable mill, reactor, or other mixing device, in order to insure thorough blending of the isocyanate with the other components. It is preferable to blend together first the phenolic resin with the blocking agent, catalyst and release agent (if one or more of these latter components are used) and then to add the polyisocyanate. Of course, the blending should be carried out for a time sufficient to produce a homogeneous blend, and under vigorous blending conditions, this will usually occur after several minutes of vigorous agitation.

The solids level of the binder formulation can be in the range of 10 to 70%, based on the weight of the solid binder plus water. It is preferred that the solids level be 20 to 60% and most preferably 35 to 55%.

It is desirable to keep the water level in the binder as low as possible when using wood particles with higher moisture content. It is suitable to use binders with higher amounts of water (i.e., lower solids content) when the moisture content of the wood is in the lower range.

The binder formulations are applied to wood particles in the manufacture of particle board, wafer board, fiber board, etc., by intermixing a stream of wood particles with a stream of the aqueous binder formulation at the desired ratio and using mechanical agitation which is common in the manufacture of composite products such as particle board. When using binders to make particle board or the like, the wood may have a wide range of moisture content, i.e., from about 1 to about 15% by weight, based on the total weight of the wood particles. However, it is advantageous if the moisture content of the wood particles is relatively low, i.e., on the order of about 2 to 8%.

The binder and resultant products are free of formaldehyde and volatile blocking agents. The resulting products have property levels that are improved compared to those prepared using the phenolic resin alone.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples:
Isocyanate A: a polymethylene poly(phenylisocyanate) blend having a viscosity of 200 mPa·s, and an isocyanate content of 31.5%.
Resole A: an aqueous solution of phenol formaldehyde resin prepared using excess formaldehyde. It has solids level about 57.5%, a viscosity of about 190 mPa·s, and a pH value of about 11; commercially available from Borden Chemical under the name Cascophen® OS707.
Blocking Agent A: 4-hydroxybenzaldehyde oxime (This component was prepared in the laboratory by the following procedure.)

Into a 500 ml round bottom flask equipped with a magnetic stirring bar, 40.49 g (331.6 mmol) of 4-hydroxybenzaldehyde were added. The aldehyde was dissolved in 240 ml methanol. To the stirred solution, 22.99 g (348.1 mmol) of 50% aqueous solution of hydroxylamine was added over a 15 min. period. The mixture was stirred for an additional 2 hr, at which time it was judged to be complete by the disappearance of the starting aldehyde as observed by thin layer chromatography ($SiO_2$/$CH_3OH$:$CH_2CL_2$ 5:95). The solvent was removed in vacuo to give the product 4-hydroxybenzaldehyde oxime as a dark tan oil, which was recrystallized from water.
Blocking Agent B: 3-hydroxybenzaldehyde oxime (This compound was prepared in the laboratory using the procedure as described above for Blocking Agent A, except that the 4-hydroxybenzaldehyde starting material was replaced with the isomer 3-hydroxybenzaldehyde.) The resultant product was a dark tan oil, which crystallized upon standing neat (no water).
Blocking Agent C: bis (4-hydroxy) benzophenone oxime (This compound was prepared in the laboratory by the following procedure.)

Into a 500 ml round bottom flask equipped with a magnetic stirring bar, 50 g (233.4 mmol) of bis(4-hydroxybenzophenone) and 28.5 g (410.8 mmol) hydroxylamine hydrochloride were added. The solids were dissolved in a mixture of 140 ml ethanol and 50 ml water. To the stirred solution, 23.3 g (282.4 mmol) of sodium acetate was added portion-wise over a 15 min. period. The mixture was stirred for an additional 2 hr, at which time it was judged to be complete by the disappearance of the starting aldehyde as observed by thin layer chromatography ($SiO_2$/$CH_3OH$:$CH_2CL_2$ 3:97). The mixture was chilled to 0° C. and a precipitate was formed. Solids were filtered off and the product, bis (4-hydroxy) benzophenone oxime, was concentrated in vacuo to a light tan crystalline solid that was used without further purification.
Procedure for Preparation of Binder A Into a 300 ml beaker, 9.45 g (68.9 mmol) of Blocking Agent A and 100 g of distilled water were added. Then, 5.50 g (68.75 mmol) of sodium hydroxide solution (50% aqueous) were added while stirring. 90.59 g (689.9 mmol) of Isocyanate A were added over a period of 10 minutes to the oxime sample while being mixed under high shear (4000–5000 rpm). The mixture was discharged into 822 g of Resole A, which was being stirred at 3000–4000 rpm. The resin mixture was stirred for an additional 5 minutes until it appeared to be homogeneous. The resin mixture was stored at 4° C. for 16 h prior to evaluation in oriented strandboard panels.
Procedure for Preparation of Binder B Into a 300 ml beaker, 40.00 g (291.69 mmol) of Blocking Agent B and 85 g of distilled water were added. 23.33 g (291.62 mmol) of sodium hydroxide solution (50% aqueous) were added while stirring. 38.29 g (291.62 mmol) of Isocyanate A were added over a period of 10 minutes to the oxime sample while being mixed under high shear (4000–5000 rpm). The mixture was discharged into 680 g of Resole A, which was being stirred at 3000–4000 rpm. The resin mixture was stirred for an additional 5 minutes until it appeared to be homogeneous. The resin mixture was stored at 4° C. for 16 h prior to evaluation in oriented strandboard panels.
Procedure for Preparation of Binder C Into a 300 ml beaker, 40.00 g (291.69 mmol) of Blocking Agent B and 81.64 g of distilled water were added. Then, 11.66 g (145.75 mmol) of sodium hydroxide solution (50% aqueous) was added while stirring. To the oxime sample, 38.29 g (291.62 mmol) of Isocyanate A were added over a period of 10 minutes while being mixed under high shear (4000–5000 rpm). The mixture was discharged into 734 g of Resole A, which was being stirred at 3000–4000 rpm. The resin mixture was stirred for an additional 5 minutes until it appeared to be homogeneous. The resin mixture was stored at 4° C. for 16 h prior to evaluation in oriented strandboard panels.
Procedure for Preparation of Binder D For this system, 60.02 g of distilled water was placed in a pint jar, followed by 25.54 g of Blocking Agent C, which had been previously finely ground by using an aggregate mortar. Then, 9.00 g of 50% sodium hydroxide solution was added to bring Blocking Agent C. to similar pH as Resole A. 14.16 g of Isocyanate A were added, and the sample was mixed under high shear (8000 rpm in a IKA Works Ultraturrax T-20 Basic high shear mixer). Total time elapsed during Isocyanate A introduction and mixing was four minutes.

To a 90.71 g aliquot of the above sample, 186.83 g of Resole A were added, and the sample was mixed at low shear (1000 rpm, using an IKA Works Eurostar Digi-visc mixer) for five minutes. The resin mixture was not stored prior to being evaluated in particleboard panels.

General Comments Concerning Oriented Strandboard Panels

The aspen strands used were obtained from the Louisiana-Pacific Corporation of Portland, Oreg. They had moisture contents in the range of from 1% to 10%. The average strand size was targeted to be 0.03"×0.5"×1.75" (thickness/width/length).

Measurement of the Modulus of Rupture (MOR) was made as follows. A test specimen of 2"×14" was cut from each board. The specimen was weighed to ±0.1 gram and its thickness was measured to ±0.001 inch. The thickness measurement reported was an average of three different measurements, each taken at the center (i.e., 7" from each end of the specimen) and at the 3" center points from each end of the board. The span used was 8.0" and the load was applied at 0.5 inches/minute. The specimen was placed on the jig with ½ of it extending past one support and broken. The specimen was then turned over and was rebroken with ½ of it extending past the other support. Two breaks were measured on each MOR sample and the loads were recorded to ±0.1 lb. The MOR was reported as an average (psi).

A 6-cycle test was used to evaluate the delamination and strength retention of specimens of the product after six moisture cycles. This test was conducted as follows. The specimen size was 2"×14" and each specimen was weathered per APA Test Method D-5 which is described as follows:

All of the specimens were placed in a rack such that they remained separated throughout testing to assure proper drying. The racks were then placed in a pressure vessel and completely submerged in 150° F. water. A vacuum of 15 inches of mercury was drawn, maintained for 30 minutes and released. Specimens were then allowed to soak in the same water at atmospheric pressure for 30 minutes with no additional heating. Afterwards, the specimens were removed and dried for six hours at 180° F. in an oven with fan-forced air circulation of 45 to 50 air changes per minute. Specimens were then returned to the pressure vessel and the vacuum-soak cycle was repeated. Following the second vacuum-soak cycle, specimens were again placed in the oven and dried for 15 hours at 180° F. This completed two cycles. This process was continued for two additional days until six cycles were completed.

Procedure for Preparation of Oriented Strandboard Panels 7480 grams of aspen strands having a moisture content of 3.4% were placed in a rotating drum blender and were sprayed with 299.2 grams of one of the Binders A–C as described above, and 74.8 grams of a commercially available 47% solids dispersion of wax (Cascowax® EW-403H, Borden Chemicals). Next, 1738.4 grams of the resin-treated strands were taken from the drum blender and spread evenly in a 14.75"×14.75" mold to form a mat. The mat was then hot pressed at 400° F. for 8.5 minutes to produce a strandboard specimen with a target thickness of about 0.75". This was repeated to produce four specimens from each Binder.

Four control strandboard specimens were likewise made by spraying aspen strands with Resole A instead of using the experimental resin blends. The bond strength of each strandboard specimen was then measured, and the average results of the four specimens are set forth in Table 1.

Procedure for Preparation of Particleboard Panels 372.81 g of particleboard furnish were added to the mixing bowl of a KitchenAid model KSM-90 mixer. The mixer was set to its lowest setting, and 34.41 g of Binder D were added drop-wise over a five minute period. The sample was then allowed to mix for ten minutes, after which 370.20 g of the coated particleboard furnish was placed in a form (8"×8"×3"). The furnish-containing form was placed in a PHI model PW22 hydraulic press, and pressed to a thickness of about 0.5 inches for 9 minutes at 400° F.

A control particleboard specimen was prepared using the procedure described above, with the exception that Resole A was substituted for Binder D.

Of the resultant boards, 3 specimens were tested for Internal Bond Strength and 2 specimens were tested for Thickness Swell in accordance with ASTM method D1037, entitled: Evaluating Properties of Wood-Base Fiber and Particle Panel Materials. Average results are set forth in Table 2.

TABLE 1

Results of Binder A–C samples in laboratory prepared oriented strandboard.

| Example | Description | Density (Pcf) | IB (psi) | MOR (psi) | Six cycle MOR | 6-MOR % Retention | % Water Absorption | % Thickness Swell |
|---|---|---|---|---|---|---|---|---|
| 1 | Binder A | 40.24 | 43.3 | 3351 | 1296 | 38.9 | 36.3 | 13.6 |
| 2 | Binder B | 40.00 | 34.8 | 3074 | 1488 | 49.6 | 38.1 | 14.0 |
| 3 | Binder C | 39.96 | 30.7 | 2370 | 1323 | 54.7 | 35.9 | 15.3 |
| 4 (Control) | Resole A | 39.93 | 44.1 | 3088 | 1836 | 64.7 | 31.1 | 9.1 |

TABLE 2

Results of Binder D sample analysis in laboratory prepared particleboard.

| Example | Description | Density (IB) (lb./cu. Ft.) | IB (psi) | Density (swell) (lb./cu. ft.) | Thickness Swell, % |
|---|---|---|---|---|---|
| 5 (Control) | Resole A | 41 | 21 | 43 | 35 |
| 6 | Binder D | 44 | 43 | 42 | 37 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of wood composite materials comprising:
   a) combining wood particles with 2 to 15% by weight, based on the total weight of the wood composite, of a composition consisting essentially of:
      (1) an aqueous dispersion of a blocked polyisocyanate component consisting essentially of an adduct of:
         (i) a polymethylene poly(phenylisocyanate) having a functionality of about 2.1 to about 3.5, an NCO group content of from about 30% to about 33%, and a monomer content of from about 30% to about 90% by weight, wherein the content of the monomer comprises from up to about 5% by weight of the 2,2'-isomer, from about 1% to about 20%. by weight of the 2,4'-isomer, and from about 25% to about 65% by weight of the 4,4'-isomer, based on the entire weight of the polyisocyanate; and (ii) a compound corresponding to one of the general formulas:

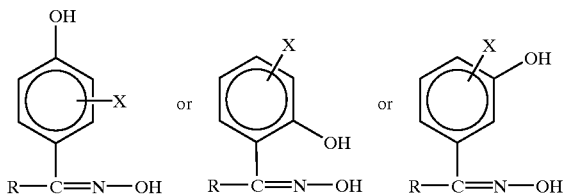

wherein:
R: represents a hydrogen atom, an alkyl group having from 1 to 12 carbon atoms, a phenyl group, or a substituted phenyl group; and
X: represents a hydrogen atom, an alkyl group having from 1 to 12 carbon atoms, an alkoxy group having from 1 to 12 carbon atoms, a phenyl group, a substituted phenyl group, or a methylol radical; and (2) an aqueous solution of a phenolic resin, wherein the weight ratio of component (1) to component (2) is from 4:1 to 1:20; and b) molding or compressing the combination formed in a).

2. The process of claim 1, wherein the weight ratio of component (1)(i) to (1)(ii) is from 10:1 to 1:10.

3. The process of claim 1, wherein the weight ratio of component (1) to component (2) is from 1:1 to 1:10.

4. The process of claim 3, wherein the weight ratio of component (1) to component (2) is from 1:2 to 1:5.

5. The process of claim 1, wherein the weight ratio of component (1)(i) to (1)(ii) is from 5:1 to 1:5.

6. The process of claim 5, wherein the weight ratio of component (1)(i) to (1)(ii) is from 2:1 to 1:1.

7. The process of claim 1, wherein the wood particles are combined with from 4 to 10% by weight, based on the total weight of the wood composite, of said composition.

8. The process of claim 1, wherein the solids content of the sum of (1) said aqueous dispersion of a blocked polyisocyanate component and (2) said aqueous solution of a resole phenolic resin is from 10 to 70% by weight, based on the combined weight of components (1) and (2).

9. The process of claim 8, wherein the solids content is from 20 to 60% by weight.

10. The process of claim 1, wherein component (1)(i) said polymethylene poly(phenylisocyanate) has a functionality of about 2.3 to about 3.0, an NCO group content of about 30.5% to about 32.5%, a monomer content of about 40 to 70% by weight, and a polymeric MDI content of about 30 to 60% by weight.

11. The process of claim 10, wherein the monomeric MDI comprises less than 1% by weight of the 2,2'-isomer, less than 5% by weight of the 2,4'-isomer, and from about 30 to about 60% by weight of the 4,4'-isomer, based on the total weight of the polyisocyanate.

12. The process of claim 1, wherein R represents a substituted hydroxyphenyl group; and X represents an alkyl methylol radical.

13. The process of claim 12, wherein X represents an alkyl methylol radical having from 1 to 12 carbon atoms.

14. The process of claim 1, wherein (1)(ii) comprises 2-hydroxybenzaldoxime, 3-hydroxybenzaldoxime, 4-hydroxybenzaldoxime, heptylsalicylaldoxime, octylsalicylaldoxime, nonylsalicylaldoxime, dodecylsalicylaldoxime, 4,4'-dihydroxybenzophenone oxime, and mixtures thereof.

15. The process of claim 1, wherein b) the molding or compressing of the combination formed in a) occurs at pressures of from about 200 to 1,000 psi for about 2 to about 10 minutes, and at temperatures in the range of from about 120 to about 220° C.

16. The process of claim 15, wherein the pressure ranges from about 300 to about 700 psi for about 4 to about 8 minutes, and the temperature ranges from about 150 to about 200° C.

* * * * *